United States Patent
Natanzon et al.

(10) Patent No.: US 11,281,635 B2
(45) Date of Patent: Mar. 22, 2022

(54) SERVERLESS SOLUTION FOR OPTIMIZATION OF OBJECT VERSIONING

(71) Applicant: EMC IP Holding Company LLC, Hopkinton, MA (US)

(72) Inventors: Assaf Natanzon, Tel Aviv (IL); Yossef Saad, Ganei Tikva (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 511 days.

(21) Appl. No.: 16/172,337

(22) Filed: Oct. 26, 2018

(65) Prior Publication Data

US 2020/0134030 A1 Apr. 30, 2020

(51) Int. Cl.
*G06F 16/00* (2019.01)
*G06F 16/18* (2019.01)
*G06F 16/16* (2019.01)
*G06F 9/54* (2006.01)

(52) U.S. Cl.
CPC ........... *G06F 16/1873* (2019.01); *G06F 9/54* (2013.01); *G06F 16/162* (2019.01)

(58) Field of Classification Search
CPC .................. G06F 16/1873; G06F 16/162
USPC ....................................................... 707/695
See application file for complete search history.

(56) References Cited

U.S. PATENT DOCUMENTS

| 8,190,742 B2 | 5/2012 | Fineberg et al. |
| 10,185,628 B1* | 1/2019 | Snyder ................ G06F 11/1451 |
| 2017/0193028 A1* | 7/2017 | Iyengar ............... G06F 16/2358 |

OTHER PUBLICATIONS

Michael Behrendt "Serverless Computing: Customer Adoption Insights & Patterns,"Second International Workshop on Serverless Computing (WoSC) 2017, part of Middleware 2017, Nov. 25, 2017 pp. 1-35.
Iyengar, Arun "Providing Enhanced Functionality for Data Store Clients"2017 IEEE 33$^{rd}$ International Conference on Data Engineering (ICDE), IEEE, Apr. 19, 2017 pp. 1237-1248.
International Search Report and Written Opinion issued in Application No. PCT/US2019/041117 dated Oct. 29, 2019.

* cited by examiner

*Primary Examiner* — Chelcie L Daye
(74) *Attorney, Agent, or Firm* — Workman Nydegger

(57) ABSTRACT

One example method includes implementing a function as a service (FaaS) at a datacenter by performing operations including receiving an application program interface (API) gateway call from a client application, wherein the API gateway call is associated with an object PUT request, and automatically triggering, with the API gateway call, performance of an object insertion function. The object insertion function includes retrieving, from backend object storage, a previous version of the object, differentially compressing the object relative to the previous version of the object so as to generate a differential, and storing the differential in the backend object storage.

20 Claims, 7 Drawing Sheets

SERVERLESS SOLUTION FOR OPTIMIZATION OF OBJECT VERSIONING

FIELD OF THE INVENTION

Embodiments of the present invention generally relate to data protection and availability. More particularly, at least some embodiments of the invention relate to systems, hardware, software, computer-readable media, and methods for optimizing object versioning so as to help reduce the amount of storage consumed by objects.

BACKGROUND

Enterprises generate significant amounts of important data that is typically preserved in some type of data protection environment. Typical data protection environments employ a variety of hardware and software in order to provide data security, access, and availability.

For example, object storage is used widely today in public clouds and also on premises at an enterprise or other entity. Examples of such public cloud storage environments include Amazon S3 and Dell EMC Elastic Cloud Storage (ECS).

Many of the object stores employed by cloud storage environments support object versioning, thus allowing the user to keep previous versions of an objects for purposes of data protection and data management. However, this flexibility and capacity comes at a price. That is, even though different versions of the same object are often very similar to each other the user must pay for the storage capacity that each full version of the object consumes. Thus, the user is paying for storage capacity that may not be needed.

In more detail, versions of the same object tend to be similar. In the case of presentation and Word documents for example, each version of the file usually only slightly changes the object. Another example is backup copies of the object. Backups are taken periodically, such as once a day, and the copies made each day often do not differ much from each other, and possibly not at all. With current methods of creating versions, the storage for which the customer is charged consists of a full copy for each version, which is unnecessarily expensive. That is, the pricing for an object version is based only on the object size and not on the size, or extent of, any changes to the object, so that even if only minor changes are made to an object, the expense to store the modified version is the same as the cost to store the prior version of the object. As a result, the cost of storing an object in the cloud with multiple versions can be significantly higher than storing the object locally in a deduplication support storage, for example.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
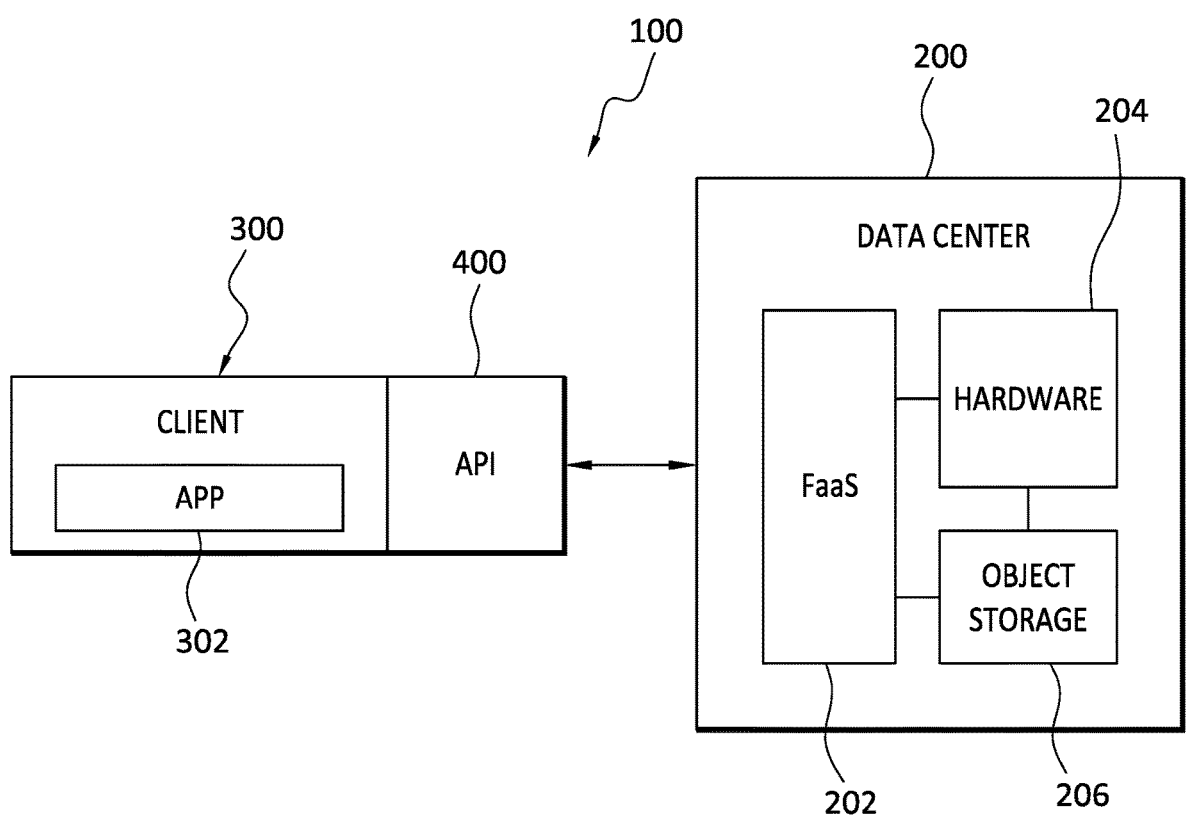
FIG. 1 discloses aspects of an example operating environment for some embodiments of the invention.

Embodiments of the present invention generally relate to data protection and availability. More particularly, at least some embodiments of the invention relate to systems, hardware, software, computer-readable media, and methods for optimizing object versioning so as to help reduce the amount of storage consumed by objects.

In general, example embodiments of the invention embrace a Function as a Service (FaaS) approach to an object versioning service which will allow compactification of multiple versions of an object, and possibly significant cost savings in view of the reduced amount of storage required for the objects of a client. As used herein, FaaS embraces, but is not limited to, a category of cloud computing services that provides a platform allowing customers to develop, run, and manage, application functionalities without the complexity of building and maintaining the infrastructure typically associated with developing and launching an app.

Embodiments within the scope of the invention include an FaaS that can leverage existing versioning supported by public clouds, but which can store the data at the public cloud in a much more compact format. In brief, an object store front end is created which will be an entry point to the FaaS service, using an application program interface (API) gateway. The API front end will expose an object store API supporting object versioning. When a function in the API front end is invoked, the FaaS will be called. The function will implement the APIs such as PUT/GET/DELETE object by forwarding the calls to a backend object storage.

Advantageously then, embodiments of the invention may provide various benefits and improvements relative to conventional hardware, systems and methods. To illustrate, embodiments of the invention may improve the operation of a computing system, or element of a computing system, by improving the efficiency with which data is stored. As well, embodiments of the invention improve the operation of computing systems by increasing the amount of space available for data storage. As a final example, embodiments of the invention improve the operation of computing systems by reducing an amount of data that is needed to be stored. Various other advantageous aspects of example embodiments of the invention will be apparent from this disclosure. Moreover, at least some example embodiments of the FaaS implementation require no external data bases. Thus, pricing is largely based on the calling of functions, rather than being based on the cost of storage. Accordingly, there significant cost savings may be realized with respect to the amount of storage used.

A. Aspects of an Example Operating Environment

The following is a discussion of aspects of example operating environments for various embodiments of the invention. This discussion is not intended to limit the operations are performed, at least some embodiments may be employed in connection with a data protection environment, which can implement backup, archive, restore, and/or disaster recovery, functions. However, the scope of the invention is not limited to this example data protection environment and extends, more generally, to any data protection environment in connection with which data is created, saved, backed up and/or restored. More generally still, the scope of the invention embraces any operating environment in which the disclosed concepts may be useful. For example, embodiments of the invention may be employed in connection with data backup and restore platforms such as the Dell-EMC NetWorker and Avamar platforms.

The data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100 may include a data protection environment which can comprise, or consist of, a datacenter 200, such as a cloud datacenter for example. The datacenter 200 may be Microsoft Azure blob storage, Amazon S3, Dell EMC ECS, or any other cloud storage environment. For example, any of a variety of FaaS vendors and associated APIs may be employed in connection with embodiments of the invention and such FaaS vendors/APIs include, but are not limited to, Amazon AWS (AWS Lambda API), Google (Firebase), Microsoft (Azure serverless functions), and IBM (Bluemix).

In the example of FIG. 1, the datacenter 200 may include an FaaS module 202 that may perform part, or all, of any of the example methods disclosed herein with respect to optimization of object storage. The datacenter 200 may also include various hardware 204, examples of which are disclosed herein, that may be used for provisioning of services that are performed by and/or at the direction of the FaaS module 202.

Because the hardware 204, which may take the form of one or more servers in some embodiments, needed to carry out user code, such as embodied by the FaaS module 202 for example, resides at the datacenter 200, some example embodiments of the invention may be referred to as implementing a serverless solution for optimization of objection versioning. That is, the FaaS module 202 may run user code in response to the occurrence of certain events, such as HTTP commands and API calls for example. In such a serverless configuration, management of the underlying resources needed to run the code may take place at the datacenter 200 rather than at the user site. As such, the user need not have, or provision, the resources, such as servers for example, needed to run the user code. Thus, the user is spared the time and expense of maintaining the resources needed to run the user code. That is, the infrastructure needed to run the user code is provided at the datacenter 200 rather than having to be provided by the user. One example of an infrastructure that may provide for serverless client operations is the Amazon Lambda system, although the scope of the invention is not limited to this example.

The datacenter 200 may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, sand any other type of copies of data, and any combination of the foregoing. Any of the foregoing may, or may not, be deduplicated.

With continued reference to FIG. 1, the datacenter 200 may include, or otherwise have access to, object storage 206. In general, the object storage 206, which may also be referred to herein as simply an object store, may retrievably store objects and versions of objects in connection with PUT, GET, and DELETE commands and operations, for example. The object storage 206 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, object storage 206 can use Hard Disk Drive (HDD) storage for throughput intensive workloads.

As indicated in FIG. 1, the operating environment 100 may include one or more clients 300. In general, a client 300 may be any computing entity, which may comprise hardware and/or software, that performs various processes relating to one or more objects. Such processes may include, for example, creating, deleting, and modifying an object. One, some, or all, of these processes can be performed by an application, or applications, residing at or hosted by the client 300. In some particular embodiments, the client 300 may comprise, or consist of, a backup and restore server, although that is not required.

In connection with the performance of various processes and operations concerning objects and object versions, the client 300 may include an app 302 operable by the user to issue API calls to an API 400 by way of which the user can access the FaaS 202. As such, the API 400 may serve as an entry point to the FaaS 202. Further details concerning the operation of the client 300, API 400, and FaaS 202 are disclosed elsewhere herein.

B. Example Host and Server Configurations

Figure 2:
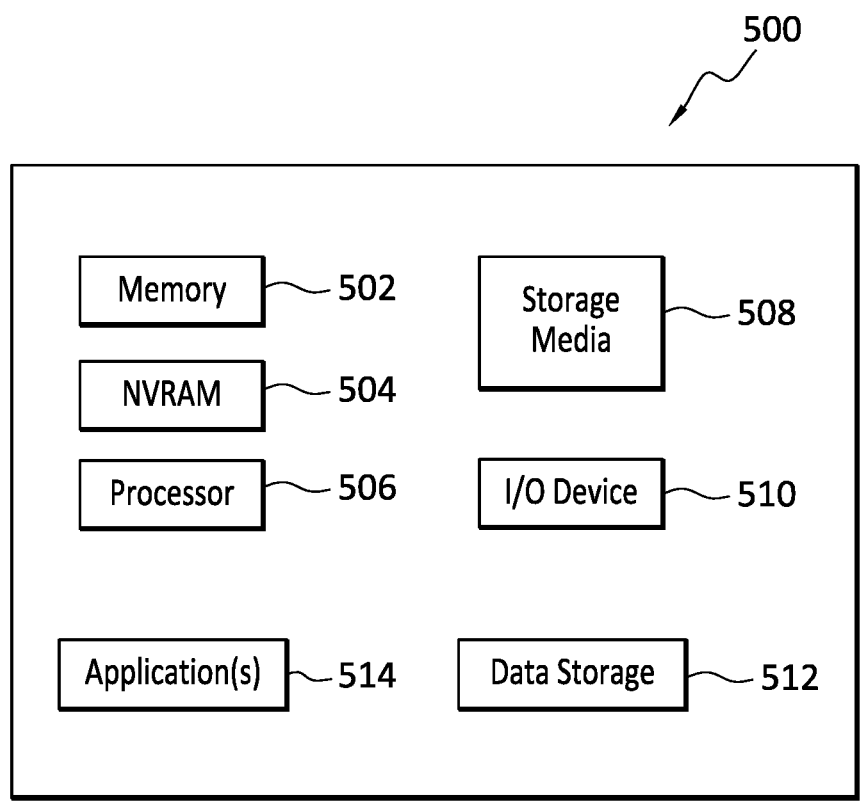
FIG. 2 discloses aspects of an example host configuration.

With reference briefly now to FIG. 2, any one or more of the datacenter 200, FaaS module 202, hardware 204, object storage 206, client 300, and API 400/, can take the form of, or include, or be implemented on, or hosted by, a physical computing device, one example of which is denoted at 500. By way of example, some or all of the FaaS 202 functionality may be implemented in a server at the datacenter 200. As well, where any of the aforementioned elements comprise or consist of a virtual machine (VM), that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 can take the form of solid state device (SSD) storage. As well, one or more applications 514 are provided that comprise executable instructions. Such executable instructions can take various forms including, for example, instructions executable to perform any method or portion thereof disclosed herein, and/or executable by/at any of a storage site, whether on-premised at an enterprise, or a cloud storage site, client, datacenter, or backup server to perform functions disclosed herein in connection with embodiments of the FaaS 202. As well, such instructions may be executable to perform any of the other operations disclosed herein including, but not limited to, read, write, backup, and restore, operations and/or any other data protection operation.

C. Example FaaS Operations and Configuration

Figure 3:
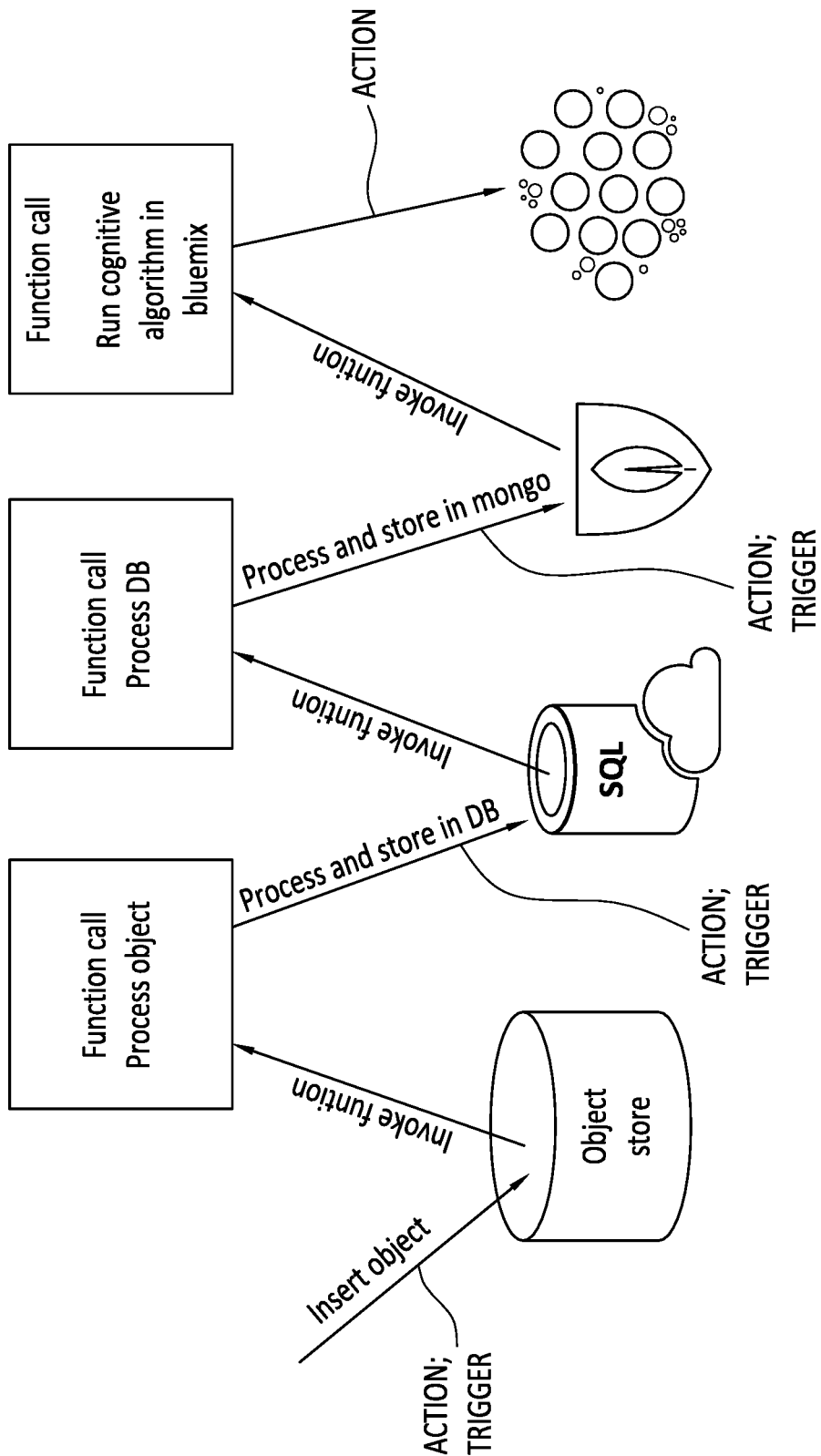
FIG. 3 is a diagram that discloses some general aspects of the structure and operation of an FaaS.

Turning now to FIG. 3, details are provided concerning an example workflow of an FaaS. The particular operation indicated is an object insertion, but the general workflow indicated is applicable to other operations as well. In the example of FIG. 3, an action, such as the insertion of an object within an object store, triggers a function call, such as a function for processing the object and storing the object in a database (DB). In some instances, the triggering action may be initiated by a client or user for example, by way of an API, one example of which is disclosed in FIG. 1. As such, the 'insert object' process may comprise an action, that is, the insertion of the object, and may also serve as a trigger to trigger a further function call, such as the function call for processing and storing of the object. This approach may be referred to as having a chain format or structure.

As further indicated in FIG. 3, the action/trigger process may proceed in a cascading, or dependent, form in which, for example, a first action/trigger, such as 'insert object,' may cause the performance of a second action by triggering, that is, causing the invocation of, a function call, such as 'process object,' that results in performance of the second action, that is, the processing of the object. Thus, while the 'process object' function call may not explicitly be called by the user, the 'process object' function call is implicitly called when the user initiates the action of object insertion that causes 'process object' function to be called.

In each recurrence of the action/trigger process, an action may be directed to a different respective entity. Thus, in the illustrated example, the 'insert object' action is directed to an object store, while the action associated with the 'process object' function call is directed to a SQL database. However, it is not required that each action be directed to a different respective entity and, in some embodiments, one or more actions may be directed to a common entity. This action/trigger approach can be repeated as necessary.

Thus, in the example of FIG. 3, the processing of the object in connection with the 'process object' function call is an action that also serves as a trigger to invoke a 'process DB' function call which causes processing and storing of the object in a SQL database. Such processing and storage, in turn, triggers the invocation of a 'process DB' function call which causes the object to be processed and then stored in a distributed database, such as Mongo for example. Finally, the processing and storage concerning the distributed database may then, in turn, trigger the invocation of a 'run cognitive algorithm in bluemix' function call which causes a cognitive algorithm to be run with respect to the object in the IBM Bluemix environment. In general, IBM Bluemix is a cloud platform that supports various languages and services and enables applications to be built, run and deployed in a cloud computing environment.

In connection with the example of FIG. 3, the example FaaS workflow disclosed there can be performed at a site remote from a user site, such as a cloud datacenter for example, though the various functions performed can be initiated by the user. Moreover, provisioning for the example FaaS workflow can be performed at the cloud datacenter by an FaaS module. Thus, the example FaaS workflow and associated functions may be referred to as being serverless in nature since the server(s) that implement the workflow and functions are not located at the user site.

D. Example Object Versioning Services and Architecture

Figure 4:
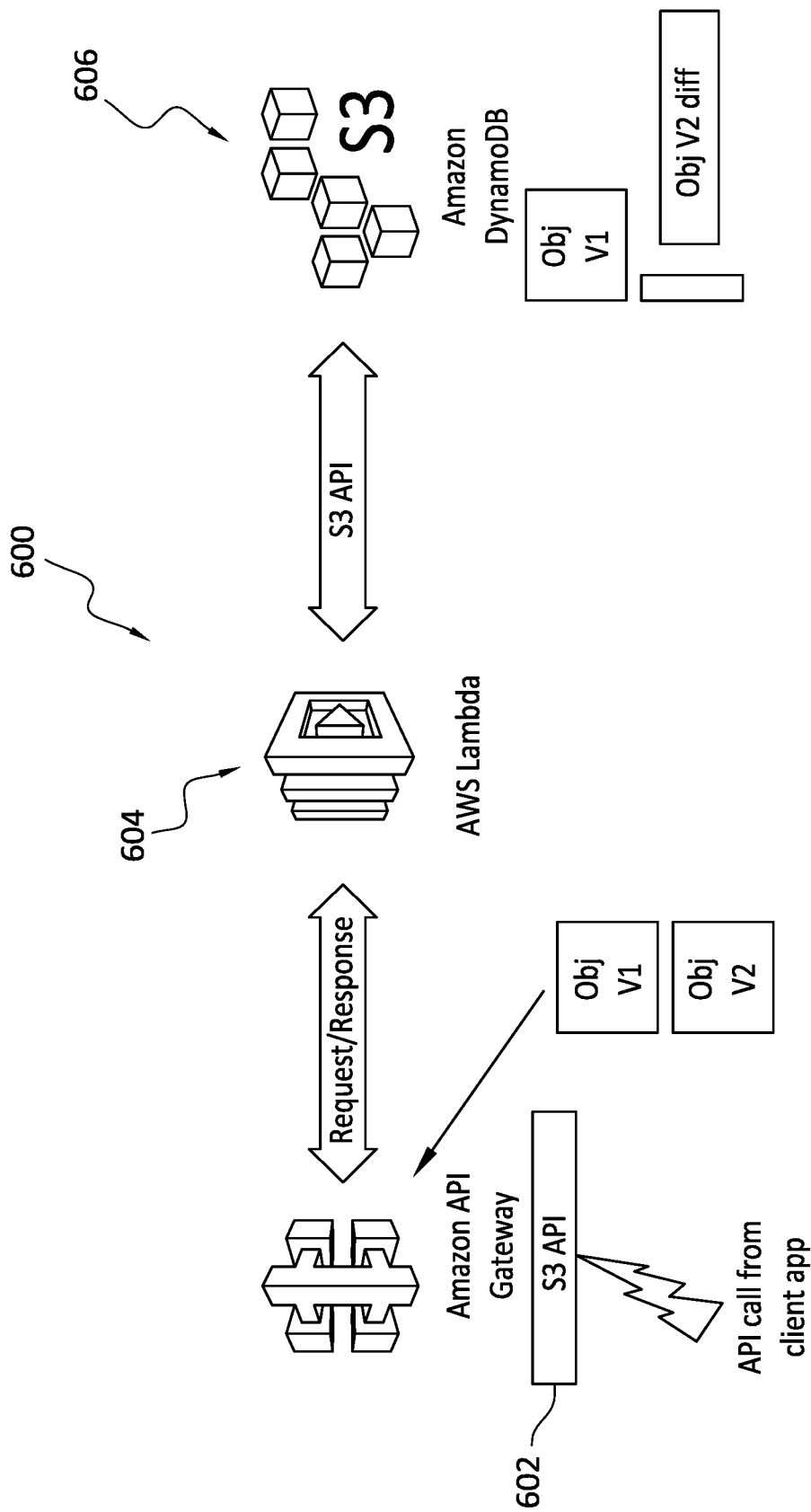
FIG. 4 is a diagram that discloses some aspects of the structure and operation of an FaaS involving object versioning.

With reference now to FIG. 4, details are provided concerning some example object versioning services, implemented as an FaaS, and associated architectures. In general, FIG. 4 discloses an object store versioning efficient scheme in an Amazon Lambda implementation, although such schemes can be implemented over any object store and any FaaS service. Briefly summarized, example of FIG. 4 discloses a scheme where the user writes to a regular Amazon S3 API and a function is call and performed that creates the differential object and stores it efficiently in backend storage.

In the example of FIG. 4, the architecture 600 comprises an Amazon Lambda implementation. However, the scope of the invention is not limited to this example implementation. In connection with the architecture 600, a method (see FIG. 5) may be implemented for creating a service for object versioning using function as a service (FaaS). In general, the object versioning service can leverage existing versioning supported by public clouds, but keep the data in a much more compact format.

The example architecture 600 includes an object store front end, which comprises, or consists of, an API 602, that serves as an entry point to the FaaS service. The API 602 may comprise the Amazon S3 API for example, although no particular API is necessarily required. The API 602 may be exposed to a user, such as the client 300 (see FIG. 2) and may receive API calls from a client app, such as the client app 302. In general, the API 602 front end will expose an object store API supporting object versioning. When a function in the API 602 front end is invoked, a function as a service (FaaS) will be called by transmitting a request for execution of user code from the API 602 to a compute service platform 604, such as AWS Lambda for example. The compute service platform 604 may respond back to the API 602, indicating, for example, that the request for execution of user code has been received.

The compute service platform 604 may then execute the user code. For example, the FaaS may implement the API calls, such as PUT/GET/DELETE object, by forwarding the function calls to a backend object storage. In the particular example of FIG. 4, execution of the user code comprises creating and storing a differential object in Amazon S3. As shown, PUT calls may be issued by way of the API 602 for an Object-Version1 and Object-Version2. When the object versioning functionality is invoked, the Object-Version2 is compressed relative to Object-Version1, so as to form Object-Version2Diff, and stored in the backend object storage. In this way, less backend storage 606 space is consumed than would be required if the full Object-Version2 were stored. Further details concerning these and other example processes are discussed in connection with FIG. 5.

E. Example Object Versioning Methods

Figure 5:
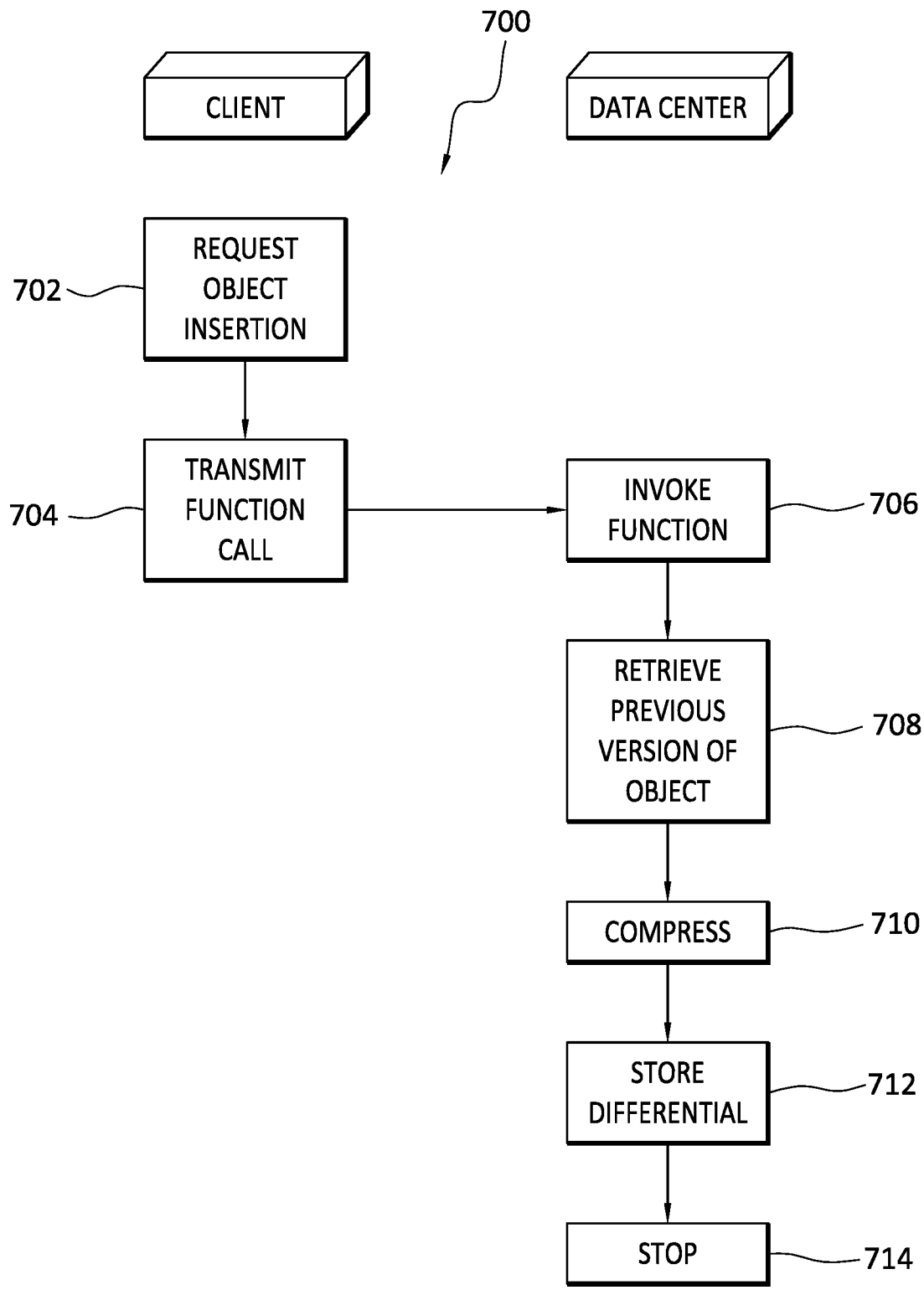
FIG. 5 is a flow diagram disclosing aspects of a method for implementing object insertion as an FaaS.

Turning now to FIG. 5, embodiments of the invention may be particularly well suited for, though not limited to, implementing object PUT operations in an efficient and effective manner, particularly when such operations are performed in connection with object versions. FIG. 5 discloses aspects of methods for PUT operations for object versions, where one example method is generally denoted at 700. Part, or all, of the method 700 may be performed, such as by an FaaS module for example, at a cloud datacenter or any other storage site that is able to service PUT/GET/ DELETE calls. Provisioning of hardware and/or software needed for performance of the method 700 may likewise take place at the cloud datacenter and/or other sites remote from the user site and, as such, the method 700 may be referred to as constituting a serverless implementation of an objection versioning process.

In general, when a new version of an object is inserted, the previous version of the object, or the first non-differential version of the object, is retrieved from the backend object store, and the new version is then compressed differentially compared to the previous version. If the differential compression is significantly better than a regular compression, for example, saving "X" more MB of storage space, the function putting the next version of the object will store only the differential and not the entire new version of the object. If the backend object service supports versioning, the differential may be entered as a new version of the object. If versioning is not supported by the backend object service, metadata information may be stored as part of the name of the object, as metadata attached to the object, or in some cases in an external database.

In some embodiments, the compression algorithm may be file-type aware. For example, an MS Office document may already be compressed and, thus, differential compression of the object may not be beneficial unless the object is first decompressed. In such a case, the system may first decompress the objects and then compress the differentials.

With particular reference now to the example of FIG. 5, the method 700 may begin when a user requests insertion of an object 702 in back end object storage, which may be located at a datacenter for example. The object insertion may be requested 702, for example, by a client application. In some particular example embodiments, the user employs a PUT request to put, or insert, an object in an object store. In such embodiments, the PUT request is used to request creation/updating of an object identified by a service URL included in the PUT request.

The PUT request, in turn, automatically causes transmission 704 of a function call, such as an API gateway call for example, to the datacenter. At the datacenter, the function call then automatically invokes 706 the function to store the object identified in the PUT request. Particularly, invocation 706 of the function triggers the FaaS module to retrieve 708 from the backend object store a previous version of the object requested to be inserted, or the first non-differential version of that object.

After the previous version, or first non-differential, version has been retrieved 708, the new version of the object may be differentially compressed relative to the previous version 710. That is, only the differences, that is, the differential, between the two versions of the objects will be stored 712. The differential may be entered in the backend object store as a new version of the object. Because the differences may be quite small in some cases, or many cases, the differential compression can result in significant space savings in the backend object store.

Where the differential compression 710 produces, or is expected to produce, little effect, that is, the differences between the two object versions are substantial, or exceed some predetermined threshold, the second version may be stored in its entirety. As noted elsewhere herein, if the backend object store does not support versioning, that is, the storing of a differential, various other approaches may be used to store and account for the new version of the object, such as by appending metadata to the previous version of the object, stored in the object store, that indicates the differences between the previous version and the new version.

If the compression algorithm is file-type aware, the process 710 may comprise decompressing the stored version of the object, and then performing a differential compression of the newer version of the object relative to the prior version of the object. If the differential compression produces little effect, the new version of the object may be compressed and then stored.

After the differential, or the entire new version, has been stored 712, the method 700 may then stop 714. Subsequent object insertion requests 702 may then reinitiate the method 700. Thus, the function calls are made only on an as-needed basis, potentially reducing the cost to the user. As well, because differentials may be created and stored, the amount of space in the backend object store consumed by a particular user may be reduced relative to the amount of space required if full object versions were stored. Further, because the method 700 may be performed in a serverless manner, the user is not required to perform any provisioning or management of hardware and/or software needed to service the function calls.

To avoid a situation where there are too many dependent copies, the system may PUT a full copy of the object for every 'nth' version of the object. For example, every 10th version of an object will include a full copy of that version. Any other approach for culling dependent copies may alternatively be used however.

As noted elsewhere herein, embodiments of the invention also embrace read processes. Accordingly, attention is directed now to FIG. 6, which discloses aspects of methods for GET operations for object versions, where one example method is generally denoted at 800. Part, or all, of the method 800 may be performed, such as by an FaaS module for example, at a cloud datacenter or any other storage site that is able to service PUT/GET/DELETE calls. Provisioning of hardware and/or software needed for performance of the method 800 may likewise take place at the cloud datacenter and/or other sites remote from the user site and, as such, the method 800 may be referred to as constituting a serverless implementation of an objection read process. In general, when reading an object version, a read function will read the object from the backend storage. If the object is a differential, the prior full copy of the object will also be retrieved and the object will be rebuilt.

Figure 6:
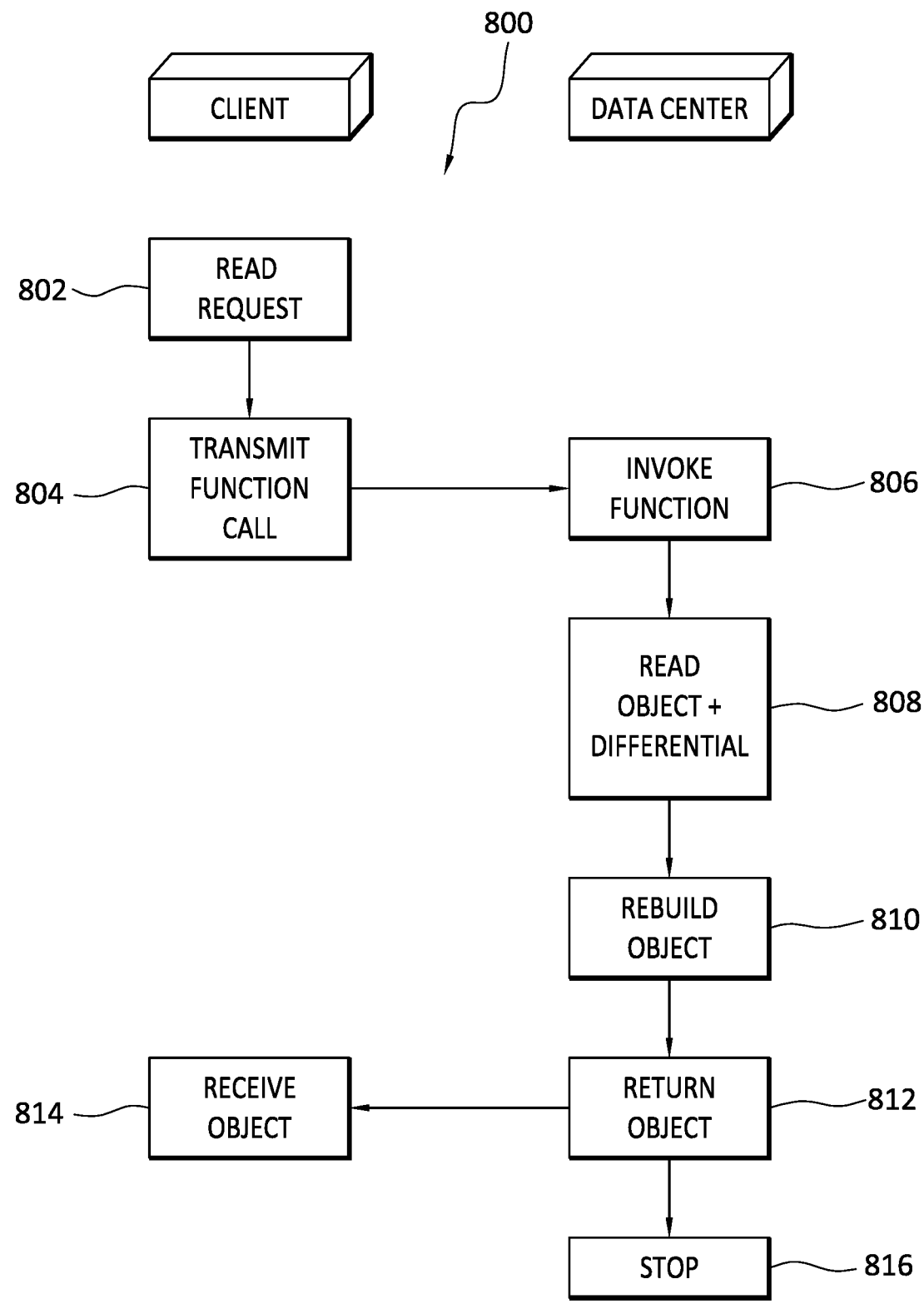
FIG. 6 is a flow diagram disclosing aspects of a method for implementing object reads as an FaaS.

With particular reference now to the example of FIG. 6, the method 800 may begin when a user requests a read of an object 802 in back end object storage, which may be located at a datacenter for example. The object read may be requested 802, for example, by a client application. In some particular example embodiments, the user employs a GET request to read an object from the back end object storage. In such embodiments, the GET request is used to request retrieval of an object identified by a service URL included in the GET request.

The GET request, in turn, automatically causes transmission 804 of a function call, such as an API gateway call for example, to the datacenter. At the datacenter, the function call then automatically invokes 806 the function to read the object identified in the GET request. Particularly, invocation 806 of the function triggers the FaaS module to retrieve 808 from the back end object storage the object identified in the read request. If the version requested by the user is a differential, the prior full copy of the object will also be retrieved along with the differentials created after the prior full copy. For example, if there are three versions existing, where one is full and the others are differentials, the last full version, and any and all the differentials created subsequent to the last full version, will be retrieved, and the object will be rebuilt 810. Thus, in embodiments where no differential is retrieved, process 810 may be omitted.

Whether only a prior full copy of the object is retrieved, or an object is rebuilt with a differential and prior full copy, the fully copy, or rebuilt object, as applicable, is then returned 812 to the client, and received by the client 814. The process 800 may then stop 816.

Figure 7:
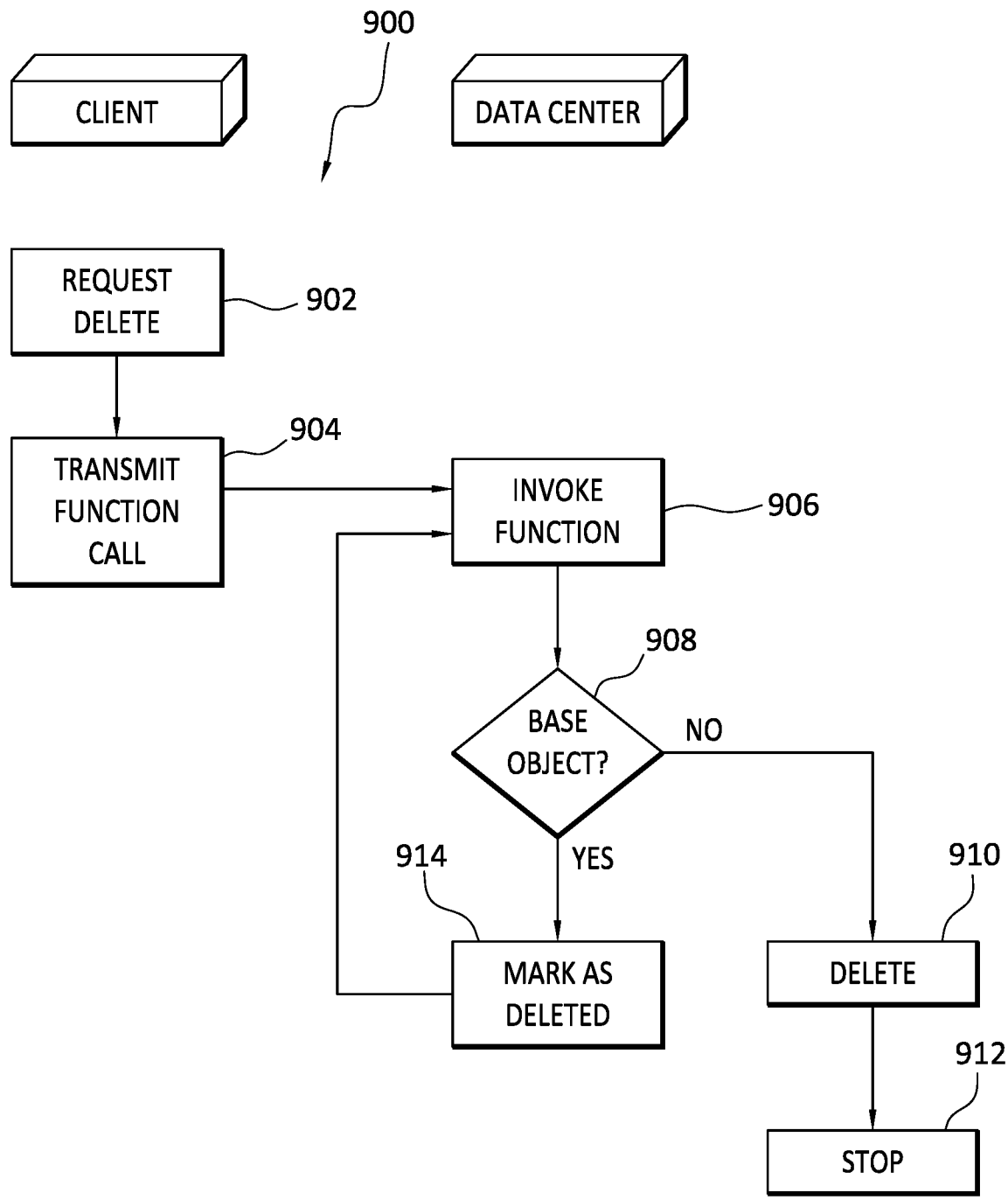
FIG. 7 is a flow diagram disclosing aspects of a method for implementing object deletion as an FaaS.

With reference finally to FIG. 7, details are provided concerning aspects of methods for DELETE operations for object versions, where one example method is generally denoted at 900. Part, or all, of the method 900 may be performed, such as by an FaaS module for example, at a cloud datacenter or any other storage site that is able to service PUT/GET/DELETE calls. Provisioning of hardware and/or software needed for performance of the method 900 may likewise take place at the cloud datacenter and/or other sites remote from the user site and, as such, the method 800 may be referred to as constituting a serverless implementation of an objection read process.

In general, when deleting an object version, a check is performed to determine whether the object is a base object for other object. In such a case, the object may be marked as deleted, for example, by putting metadata to the object, or renaming the object. Once all the dependent copies of an object are deleted, the object itself can also be deleted. To avoid a situation where there are too many dependent copies, the system may put a full copy of the object for every 'nth' version of the object. For example, every 10th version of an object will include a full copy of that version.

With particular reference now to the example of FIG. 7, the method 900 may begin when a user requests a delete of an object 902 from back end object storage, which may be located at a datacenter for example. The object delete may be requested 902, for example, by a client application. In some particular example embodiments, the user employs a DELETE request to delete an object from the back end object storage. In such embodiments, the DELETE request is used to request deletion of an object identified by a service URL included in the DELETE request.

The DELETE request, in turn, automatically causes transmission 904 of a function call, such as an API gateway call for example, to the datacenter. At the datacenter, the function call then automatically invokes 906 the function to delete the object identified in the DELETE request. Particularly, invocation 906 of the function triggers the FaaS module to check 908 whether the object requested to be deleted from the back end object storage is a base object for any other object. If it is determined 908 that the object requested to be deleted is not a base object, then that object is deleted 910 from the back end object storage, and the process 900 stops 912.

On the other hand, if it is determined 908 that the object requested to be deleted is a base object for one or more differential versions, the object may be marked as deleted 914, and the corresponding differential version deleted. Such marking 914 can be performed in any suitable matter. For example, the object may be marked 914 by adding metadata to the object indicating that it is a base object, or by renaming the object in some way to indicate that it is a base object. At this point, the method 900 may return, for example, to 906 and listen for a further invocation of the function. This may be repeated until all the dependent copies of an object are deleted, at which point the object itself can also be deleted 910.

It should be noted with respect to the respective example methods of FIGS. 5, 6 and 7, that such methods may be performed in the order indicated in those Figures, although that is not necessarily required. In other embodiments, the order of performance of one or more of the processes of any of the methods may be changed. Moreover, not all of the processes of the methods are necessarily required to be performed. For example, in some embodiments, process 810 may be omitted.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   implementing a function as a service (FaaS) at a datacenter by performing operations including:
   receiving an application program interface (API) gateway call from a client application, wherein the API gateway call is associated with an object PUT request; and
   automatically triggering, with the API gateway call, performance of an object insertion function that comprises:
   retrieving, from backend object storage, a previous version of the object;
   differentially compressing the object relative to the previous version of the object so as to generate a differential; and
   storing only the differential, and not the object, in the backend object storage.

2. The method as recited in claim 1, further comprising receiving an API gateway call associated with an object GET request, and automatically triggering, with the API gateway call associated with the object GET request, performance of an object read function that comprises:
   retrieving, from the backend object storage, an object version identified in the GET request and, when the object version is a differential, also retrieving from the backend object storage, a prior full copy of the object version and any differentials created after the prior full copy was created;
   when the object version is a differential, rebuilding the object version using the prior full copy and any differentials; and
   returning the object version.

3. The method as recited in claim 1, wherein the differential is smaller in size than both the object and the previous version of the object.

4. The method as recited in claim 1, wherein when the size of the differential exceeds a defined threshold, the differential is not stored.

5. The method as recited in claim 1, further comprising decompressing the object prior to differentially compressing the object.

6. The method as recited in claim 1, wherein the object is a file.

7. The method as recited in claim 1, further comprising receiving an API gateway call associated with an object DELETE request, and automatically triggering, with the API gateway call associated with the object DELETE request, performance of an object delete function that comprises:
   when an object version identified in the DELETE request is not a base object, deleting, from the backend object storage, the object version identified in the DELETE request;
   when the object version is a base object upon which one or more differential object versions are dependent, marking the object version as deleted, and deleting a corresponding differential object version; and
   when all dependent copies of the base object are deleted, deleting the base object.

8. The method as recited in claim 1, wherein the operations further comprise forwarding the API gateway call to the backend object storage.

9. The method as recited in claim 1, further comprising provisioning any one or more of the retrieving process, differential compression process, and differential storage process.

10. A non-transitory storage medium having stored therein computer-executable instructions which, when executed by one or more hardware processors, perform the following:
    implementing a function as a service (FaaS) at a datacenter by performing operations including:
    receiving an application program interface (API) gateway call from a client application, wherein the API gateway call is associated with an object PUT request; and
    automatically triggering, with the API gateway call, performance of an object insertion function that comprises:
        retrieving, from backend object storage, a previous version of the object;
        differentially compressing the object relative to the previous version of the object so as to generate a differential; and
        storing only the differential, and not the object, in the backend object storage.

11. The non-transitory storage medium as recited in claim 10, wherein the operations further comprise receiving an API gateway call associated with an object GET request, and automatically triggering, with the API gateway call associated with the object GET request, performance of an object read function that comprises:
    retrieving, from the backend object storage, an object version identified in the GET request and, when the object version is a differential, also retrieving from the backend object storage, a prior full copy of the object version and any differentials created after the prior full copy was created;
    when the object version is a differential, rebuilding the object version using the prior full copy and any differentials; and
    returning the object version.

12. The non-transitory storage medium as recited in claim 10, wherein the differential is smaller in size than both the object and the previous version of the object.

13. The non-transitory storage medium as recited in claim 10, wherein when the size of the differential exceeds a defined threshold, the differential is not stored.

14. The non-transitory storage medium as recited in claim 10, wherein the operations further comprise decompressing the object prior to differentially compressing the object.

15. The non-transitory storage medium as recited in claim 14, wherein the object is a file.

16. The non-transitory storage medium as recited in claim 10, wherein the operations further comprise receiving an API gateway call associated with an object DELETE request, and automatically triggering, with the API gateway call associated with the object DELETE request, performance of an object delete function that comprises:
    when an object version identified in the DELETE request is not a base object, deleting, from the backend object storage, the object version identified in the DELETE request;
    when the object version is a base object upon which one or more differential object versions are dependent, marking the object version as deleted, and deleting a corresponding differential object version; and
    when all dependent copies of the base object are deleted, deleting the base object.

17. The non-transitory storage medium as recited in claim 10, wherein the operations further comprise forwarding the API gateway call to the backend object storage.

18. The non-transitory storage medium as recited in claim 10, wherein the operations further comprise provisioning any one or more of the retrieving process, differential compression process, and differential storage process.

19. The non-transitory storage medium as recited in claim 18, wherein the API gateway call is triggered by insertion of the object in an object store.

20. A physical computing system, comprising:
    one or more hardware processors; and
    the non-transitory storage medium as recited in claim 10.

* * * * *